Figure 1:
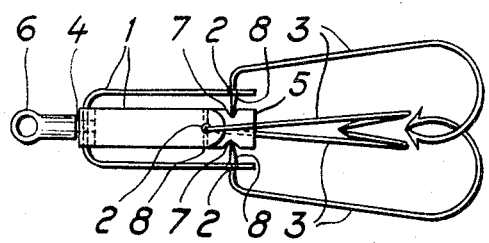

Jan. 15, 1957 N. OLSSON 2,777,242
HOOK CARRIER FOR TROLLING-SPOONS AND THE LIKE
Filed July 29, 1953

INVENTOR
Nils Olsson
BY Sommers & Young
ATTORNEYS

United States Patent Office 2,777,242
Patented Jan. 15, 1957

2,777,242
HOOK CARRIER FOR TROLLING-SPOONS AND THE LIKE

Nils Olsson, Jarbo, Sweden

Application July 29, 1953, Serial No. 371,023

1 Claim. (Cl. 43—37)

It is known already to design fishing hook carriers for trolling spoons and the like in such a way that the hooks can be swung into a position in which the hook points are situated within a space shielded by the shanks of the shafts of the hooks and the hooks are thus inoperative. Normally, these known hook types are provided with a special lock means retaining the hooks in this so-called inoperative or noncatching position from which the hooks can be swung out to operative position by the action of spring members. In this case, however, an actuation of the lock means is necessary to cause a release, and consequently the lock means must be enabled to attract the fish by being baited or the like, and there will always be a risk that the fish does not influence the lock means sufficiently to release the hooks.

Another type of these known hook carriers has no special lock means for retaining the hooks in the inoperative position, which involves that the inoperative position is very unstable and the hooks thus can be released unintentionally if the carrier touches some object in the water, for instance a reed straw. The reason for this is that in this latter type the hooks are arranged so as to be released either by a pulling of either hook or a pressure against either hook in the direction towards the release position. It is obvious that this sensitivity is very valuable, but to meet with every reasonable demand, the hook carrier must be so stable in the inoperative position that an unintentional release of the hooks cannot occur.

The present invention has for its object the provision of an improved fishing hook carrier of the latter type with a relatively stable inoperative position, but the hooks of which are nevertheless easily released by pull or pressure. A further object of the invention is to provide a hook carrier which is easy and inexpensive to produce and does not require special joints for the swinging of the hooks. The hook carrier consists of a central body which is provided with incisions or recesses and has at one end thereof an attachment for the fishing line. One or more members are mounted along said central body in such a way that they are displaceable within certain limits, and between the shanks of said members and the incisions of the central body are mounted rockers, each of which is rigidly connected to a hook in the hook carrier, and which are arranged so as to perform, under the influence of a relative movement between said members and the central body, a swinging movement between a beyond-centre-position, in which the hooks are in inoperative, that is, in non-fishing position, and a released hook position. To obtain the object of the invention, said member or members mounted on the central body consist of stirrup-shaped plate elements, which are slidably mounted on the outer side of the central body and at their lower shank end portions provided with holes for receiving the shafts of the hooks.

Figure 2:
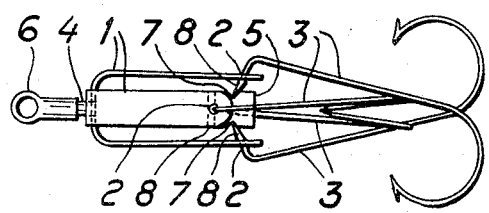
Figure 3:
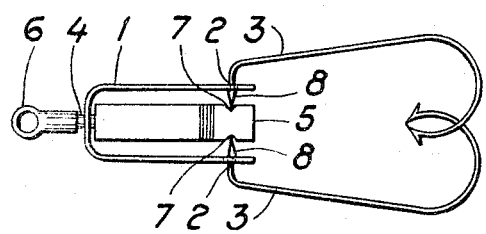

An embodiment of the invention is illustrated in the accompanying drawing, in which Fig. 1 is a side view of the hook carrier with the hooks in set position, Fig. 2 is a side view of the same device with the hooks in released position, and Fig. 3 is a side view of the hook carrier with one hook pair and the spring member co-operating therewith removed to more clearly show the function.

Figure 4:
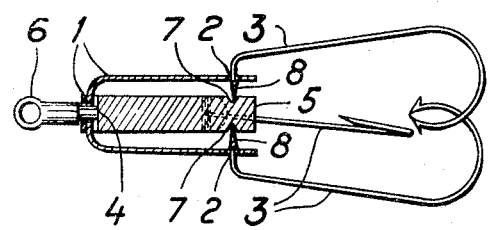

Fig. 4 is a central longitudinal section of the hook carrier.

The hook carrier shown in the drawing comprises a central body 5 having one end formed with an eye 6 for attachment of a line by means of which the central body can be secured to a trolling spoon, a fishing line or the like. The end of the central body adjacent the line attachment means 6 is provided with a portion 4 of reduced size limited by shoulders or the like, said portion 4 carrying a number of stirrup-shaped plate springs 1. The said portions 4 are inserted through corresponding holes provided in the bights of said stirrups. The latter are slidably displaceable on the portion 4 in the longitudinal direction of the central body and can thus assume an advanced position and a withdrawn position.

The shank ends of the plate springs 1 are provided with holes 2, and the remote end of the central body relative the line attachment is provided with transversely extending incisions 7 adjacent to and in line with the corresponding holes.

The hook carrier is provided with a number of hooks 3 (four being shown in the drawings) arranged in pairs to co-operate in the catching of fish. These hooks have the terminal portions of the shanks bent inwardly and inserted through the hole 2 in the plate spring shanks, the said terminal portions constituting rocker arms having knife-like ends which engage in the incisions 7. The upper portions of the said rocker arms bear against the inner surfaces of the plate springs 1, as is shown particularly in Fig. 4. This arrangement permits rotation of the composite unit or rocker arm, shank and hook with respect to the central body 5.

When the plate springs 1 are slid forward, that is, towards the line attachment means 6, to bring the hooks into the set position shown in Fig. 1, the rockers 8 are arranged to occupy a very slight beyond-centre-position, which is determined by the limited movability of the plate springs towards the line attachment 6 (see Fig. 3). This beyond-centre-position is not so stable that the release cannot be caused by either a slight rearward displacement of the springs 1 with respect to the central body 5, a pressure against the hook shafts or a rearward pulling thereof. Thus, if the carrier is combined with a trolling spoon, the release can be effected either by the fish taking the trolling spoon gliding back therefrom or by the fish biting across the carrier proper.

Of course the embodiment shown may be varied in many ways within the scope of the inventional spirit.

I claim:

A fishing hook apparatus for use with a detachable spoon bait comprising in combination an elongate central body having means for attachment to a fishing line at its front end, a pair of centrally apertured U-shaped spring shanks arranged perpendicular to each other for longitudinal slidable movement on a reduced portion of said central body, the arms of the said shanks being maintained generally parallel and spaced from the central body, abutments on said central body limiting the sliding of said shanks in both directions thereon, said central body having oppositely located incisions near the rear end thereof, the rear end of each springy shank being provided with a hole, each of said holes being so located relative to one of said incisions that it is situated slightly forwardly of its related incision when the shanks are in their foremost position and slightly rearwardly of its related incision when the shank members are in their rearmost position, a fish hook for each of said springy shanks having a forwardly disposed, inwardly bent shank portion extending through said hole in the related springy shank, said bent shank portion having its free end formed as a knife-shaped rocker which enters said transverse incision and having a shoulder against which the inner face of said springy shank presses, whereby said springy shank tends to press said rocker into the corresponding incision in one or another inclined position depending on the position of said outer member relative to said central body and said hook is held in either retracted or extended fishing position.

References Cited in the file of this patent
UNITED STATES PATENTS

| | | |
|---|---|---|
| 2,396,366 | Forbes | Mar. 12, 1946 |
| 2,474,383 | Suhr | June 28, 1949 |
| 2,613,469 | Haberkorn | Oct. 14, 1952 |